May 15, 1923.
H. H. BULLOCK
WINDSHIELD SHADE
Filed April 10, 1922
1,455,475
2 Sheets-Sheet 1
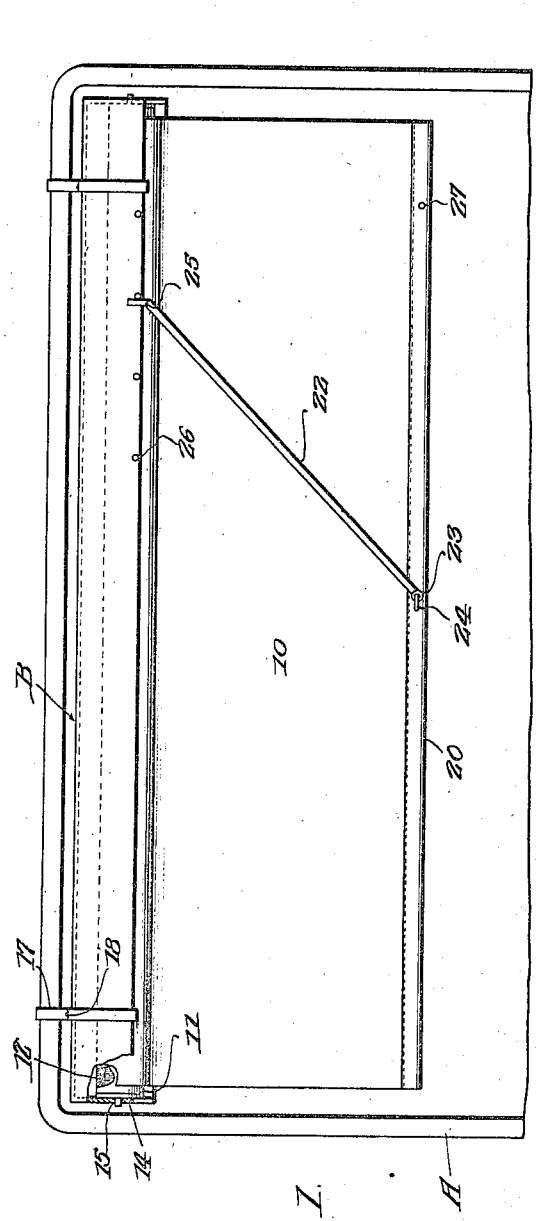
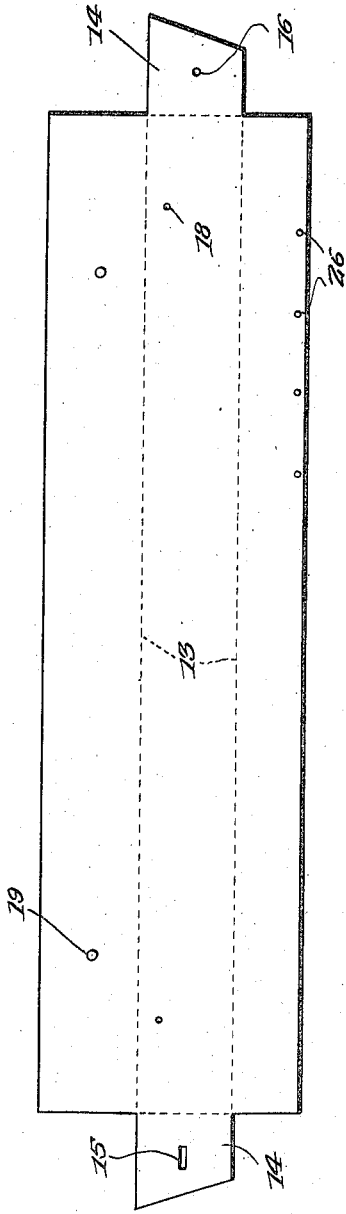

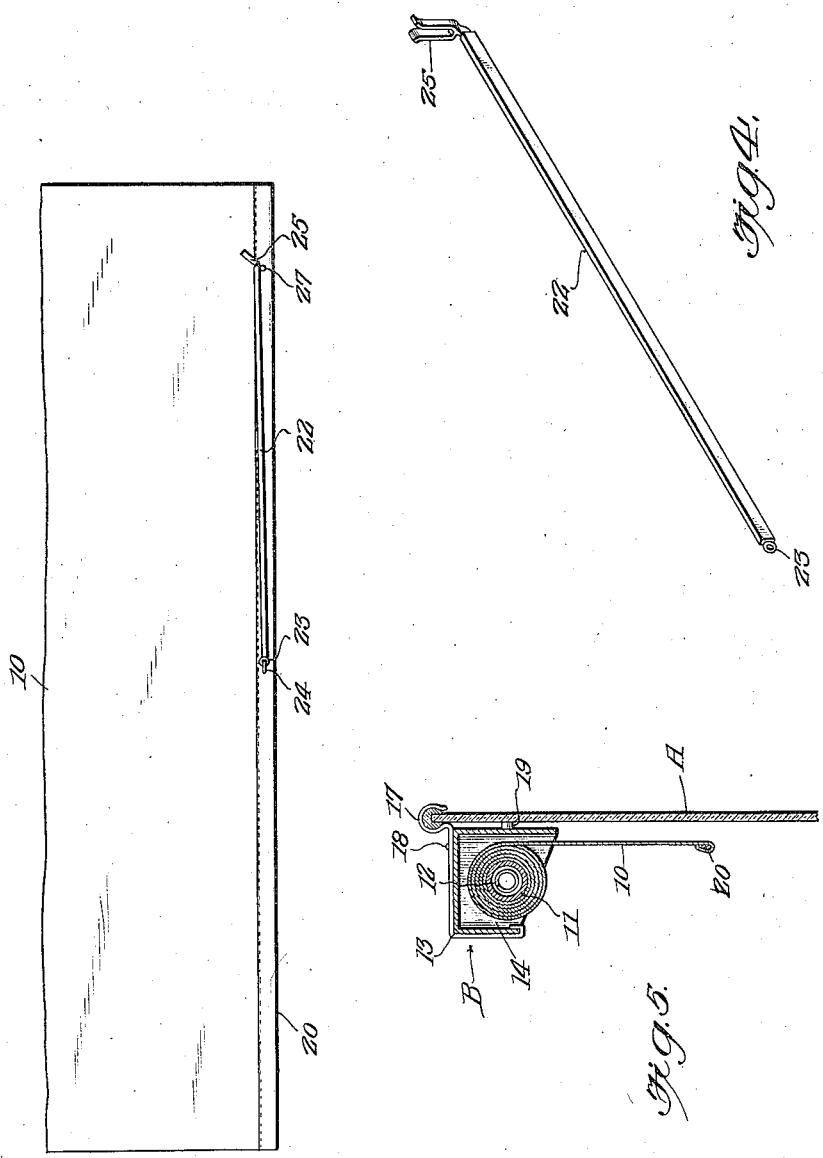

Patented May 15, 1923.

1,455,475

UNITED STATES PATENT OFFICE.

HERMON H. BULLOCK, OF WALDEN, NEW YORK.

WINDSHIELD SHADE.

Application filed April 10, 1922. Serial No. 551,143.

*To all whom it may concern:*

Be it known that I, HERMON H. BULLOCK, a citizen of the United States, residing at Walden, in the county of Orange and State of New York, have invented new and useful Improvements in Windshield Shades, of which the following is a specification.

This invention comprehends the provision of an automobile attachment, in the nature of an adjustable shade for the windshield, the shade being arranged and susceptible of being positioned with relation to the driver of the vehicle, to prevent the light rays from glaring headlights of approaching vehicles, and also the sun rays from impairing the vision of the driver of said vehicle under all conditions.

It is the purpose of the present invention to provide an attachment of the above mentioned character which is not only simple in construction and cheap to manufacture and sell, but one designed to be readily attached to or removed from the windshield for any purpose whatsoever, the invention being strictly an attachment to be manufactured and sold as a new article of manufacture.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a view in elevation snowing the attachment associated with the windshield, and a shade partly lowered in a position for use.

Figure 2 is a somewhat similar fragmentary view showing the shade supporting rod arranged parallel with and connected to the shade stick, which position it occupies just prior to rolling the shade within its casing.

Figure 3 is a plan view of the material from which the shade casing or housing is constructed.

Figure 4 is an enlarged detail view of the shade supporting stick.

Figure 5 is a sectional view through the housing with the shade positioned therein, or in other words wound about its roller.

Referring to the drawings in detail, A indicates a windshield of any well known construction, while the attachment forming the subject matter of the invention is indicated generally at B and adapted to be associated with the windshield in the manner clearly illustrated. This attachment essentially consists of a shade 10 which is adapted to be wound upon or unwound from the roller 11 which is similar in construction to the ordinary window shade roller with the exception that it is not provided with the pawl and ratchet mechanism utilized to hold such rollers in a given position. It is however provided with the usual spring indicated at 12, and the roller is journaled in a suitable housing or casing which is formed from a single blank of material illustrated in Figure 4, and which blank is bent upon the dotted lines 13 to provide a casing or housing of substantially U-shaped formation in cross section and which is arranged parallel with the upper transverse member of the windshield frame as illustrated. Projecting from the opposed ends of the blank of material are bendable extensions 14 which are provided with the usual openings or slots 15 and 16 respectively to accommodate the trunnions of the shade roller 11. These extensions 14 are bent at a right angle to the housing or casing, and fill the space between the front and rear walls thereof. Secured to the housing or casing adjacent the opposed ends thereof are suitable brackets which are formed from a single piece of material, each bracket including a loop 17 arranged above the housing or casing and designed to support the attachment from the windshield frame. These bracket strips are riveted or otherwise suitably secured as at 18 to the top of the casing or housing. It will be noted that when the shade 11 is wound about the roller 12, it is wholly disposed within the housing or casing, and thus protected from the detrimental effect of inclement weather conditions. Carried by one wall of the housing or casing, are a plurality of rubber buffers or the like 19 which bear against the windshield A. The shade 11 is of any wellknown construction and preferably made of some strong tough material suitable for the purpose. The shade is provided with the usual shade stick 20 which extends along the lower edge thereof. As above stated, the shade 11 is adapted to be lowered over the windshield the requisite distance to prevent glaring headlights of approaching vehicles, and also the light rays from the sun from impairing the vision of the driver of the vehicle with which the attachment is equipped, and it is of course manifest that the shade must necessarily be adjustable so that its position may be varied with relation to the windshield or the eyes of the driver.

I employ a positive means for holding the shade lowered in any given position, in contradistinction to relying upon the use of the pawl and ratchet mechanism usually forming part of spring rollers of the character herein illustrated. This means consists of a rod 22 which is provided at its lower end with an eye or loop 23 associated with a similar eye 24 secured to the shade stick 20. This provides a pivotal connection between the shade stick and said rod, so that the latter can be swung diagonally of the shade to an active position, or in parallelism with the shade stick to an inactive position as the occasion requires. The upper end of this rod supports a resilient clamp 25 designed to embrace and engage the front wall of the housing above described. To assist in holding the upper end of this rod associated with the adjacent wall of said housing, and thus hold the shade 11 in its lowered position, I make use of a plurality of spaced stops 26 which project from the front wall in spaced relation as illustrated. The clamp above referred to is adapted to bear against one of these stops, depending of course upon the distance the shade is lowered and also to prevent the shade from being casually wound upon the roller incident to the vibrations of the vehicle traveling over the irregular or rough surfaces. When use of the machine is not desired, the upper end of the rod 22 is separated from the adjacent wall of said casing or housing, and the rod subsequently swung to a position parallel with the shade stick 20, and is supported in this position by means of a peg or the like 27 carried by said stick. The shade 11 is thus released, and is allowed to wind about the roller and be positioned within the housing for the purpose above stated. Manifestly, I have devised a shade of the class in question, which can be readily attached to any wind shield, and conveniently manipulated for the purpose intended.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What is claimed is:—

A wind shield attachment comprising a housing adapted to be supported by the wind shield, a shade roller journaled in the housing, a shade adapted to be wound about and wound from said roller, a rod having one end pivotally associated with the lower edge of said shade, means carried by the opposite end of said rod and designed to engage the adjacent wall of said housing, to hold the shade in a lowered position, said rod being adapted to be arranged in parallel relation with the lower edge of the shade to hold the lower edge of the curtain in inactive position, means carried by the curtain for supporting said rod in its inactive position for the purpose specified.

In testimony whereof I affix my signature.

HERMON H. BULLOCK.